United States Patent [19]

Matz

[11] 3,823,274

[45] July 9, 1974

[54] FARTHEST ADVANCE CIRCUIT FOR A REMOTE STATION DICTATING SYSTEM

[75] Inventor: Bjorn J. Matz, Forest Hills, N.Y.

[73] Assignee: Dictaphone Corporation, Rye, N.Y.

[22] Filed: Jan. 10, 1973

[21] Appl. No.: 322,373

[52] U.S. Cl. ........................ 179/100.1 DR, 179/6 E

[51] Int. Cl. ...................... G11b 15/56, H04m 11/10

[58] Field of Search .... 179/6 E, 100.1 DR, 100.2 S, 179/100.2 Z

[56] References Cited

UNITED STATES PATENTS

| | | | |
|---|---|---|---|
| 3,467,790 | 9/1969 | Bolick | 179/100.1 R |
| 3,712,961 | 1/1973 | Nye | 179/100.1 DR |

*Primary Examiner*—Bernard Konick
*Assistant Examiner*—Stewart Levy
*Attorney, Agent, or Firm*—Curtis, Morris & Safford

[57] ABSTRACT

An electronic farthest advance switch in the central record/playback unit of an endless tape recording system is biased to become conductive through a mechanical switch which is closed when a loop of recorded tape has been backspaced past the magnetic record/playback head. The conductive farthest advance electronic switch provides a bias voltage to the electronic seizure, dictate and motor driver switches in the record/playback unit to activate the motor and to energize a solenoid connected to a capstan pressure roller mechanism to thereby engage and advance the loop of recorded tape past the record/playback head so that the loop of tape is ready for transcribing. Simultaneously, a reverse bias voltage is supplied to each remote dictating station connected to the central record/playback unit to prevent the remote dictating stations from seizing control of the record/playback unit during the farthest advance operation.

5 Claims, 4 Drawing Figures

FARTHEST ADVANCE CIRCUIT FOR A REMOTE STATION DICTATING SYSTEM

BACKGROUND OF THE INVENTION

The invention relates to a dictating system of the type having a plurality of remote dictating stations for use with a central record/playback, endless tape loop unit and more particularly to a farthest advance circuit for the central record/playback unit of such a dictating system.

In such dictating systems an endless loop of magnetic tape in the central record/playback unit passes through a first station and subsequently through a transcribing station. At the first station signals are either recorded on the tape or played back to the dictating unit for review of the recorded material. Between the record/playback and transcribing stations the tape may be stored loosely in a loop. In general, the transcribing and record/playback stations of such a central record/playback unit may be operated independently of each other and thus, for example, tape which has been recorded but not yet transcribed will produce a slack in the endless loop of tape between the two stations. In the playback mode, the record tape is first backspaced past the record/playback station and is then readvanced through the record/playback station.

To protect the backspaced, recorded tape from being inadvertently erased and re-recorded such systems provide a means of sensing the loop of previously recorded tape which has been backspaced but not yet readvanced through the record/playback station. In some systems this is accomplished by measuring the length of recorded or backspaced tape, for example by photoelectric sensing devices, while in other systems a mechanical switch is provided to sense the tautness of the backspaced portion of the endless loop of tape. This switch prevents the tape from being inadvertently rerecorded and in some systems the switch activates a mechanism for readvancing the recorded tape through the recording station until the slack is taken up. See for example the system disclosed in U.S. Pat. No. 3,467,790.

In prior art systems which measure the length of the backspaced portion of the tape there is the possibility of inaccuracy and such circuits are generally complex in nature. In prior art circuits of the type which sense tape slackness the circuitry connected to the slackness sensing switches is strictly electro-mechanical in nature, complex and bulky in size.

SUMMARY OF THE INVENTION

The above and other disadvantages are overcome by the present invention of an improved remote station dictating system of the type having a plurality of remote dictating stations connected to a central record/playback unit wherein the improvement comprises a farthest advance circuit having a switch for sensing the tape tautness of a portion of an endless loop of tape in the central record/playback unit which portion is immediately prior to a record/playback station, and an electronic farthest advance switch which is biased by a voltage source to become conductive upon the closing of the tape tautness switch. The conductive, farthest advance switch supplies a voltage bias to the motor driver circuit of the central record/playback unit so that the motor of the central record/playback unit continues to operate. The conductive farthest advance switch simultaneously supplies an electronic control signal to still another electronic switch which is thereby biased to become conductive and energize an electromechanical mechanical mechanism which advances the recorded tape until the tape loop portion prior to the record/playback station is taut.

When the tape loop portion is taut the tape tautness switch is opened and the electronic farthest advance switch is made non-conductive with the result that the motor driver circuit and the electro-mechanical mechanism are deenergized. During the time the motor driver circuit is energized a reverse bias signal is fed to the plurality of remote dictating stations to block them from seizing control of the central record/playback unit.

The present invention is intended for use particularly in the DICTATING AND TRANSCRIBING SYSTEM described in co-pending U.S. Pat. application Ser. No. 319,928 filed Dec. 26, 1972 of which the applicant is a joint inventor and for use with the PRIVACY AND SEIZURE CONTROL CIRCUIT FOR A REMOTE STATION DICTATING SYSTEM described in copending U.S. Pat. application Ser. No. 322,530 filed Jan. 10, 1973 of which the applicant is a sole inventor. The disclosures in these applications are incorporated herein by reference.

It is therefore an object of the present invention to provide a simplified farthest advance circuit for use in a remote station dictating system.

It is still another object of the present invention to provide a farthest advance circuit utilizing solid state electronic switches.

It is still a further object of the present invention to provide a solid state farthest advance circuit utilizing solid state electronic switches.

It is still a further object of the present invention to provide a solid state farthest advance circuit for use with a solid state seizure control system in a remote station dictating system.

The foregoing and other objectives, features, and advantages of the invention will be more readily understood upon consideration of the following detailed description of certain preferred embodiments of the invention, taken in conjunction with the accompanying drawings.

DESCRIPTION OF THE PREFERRED EMBODIMENT

Figure 1:
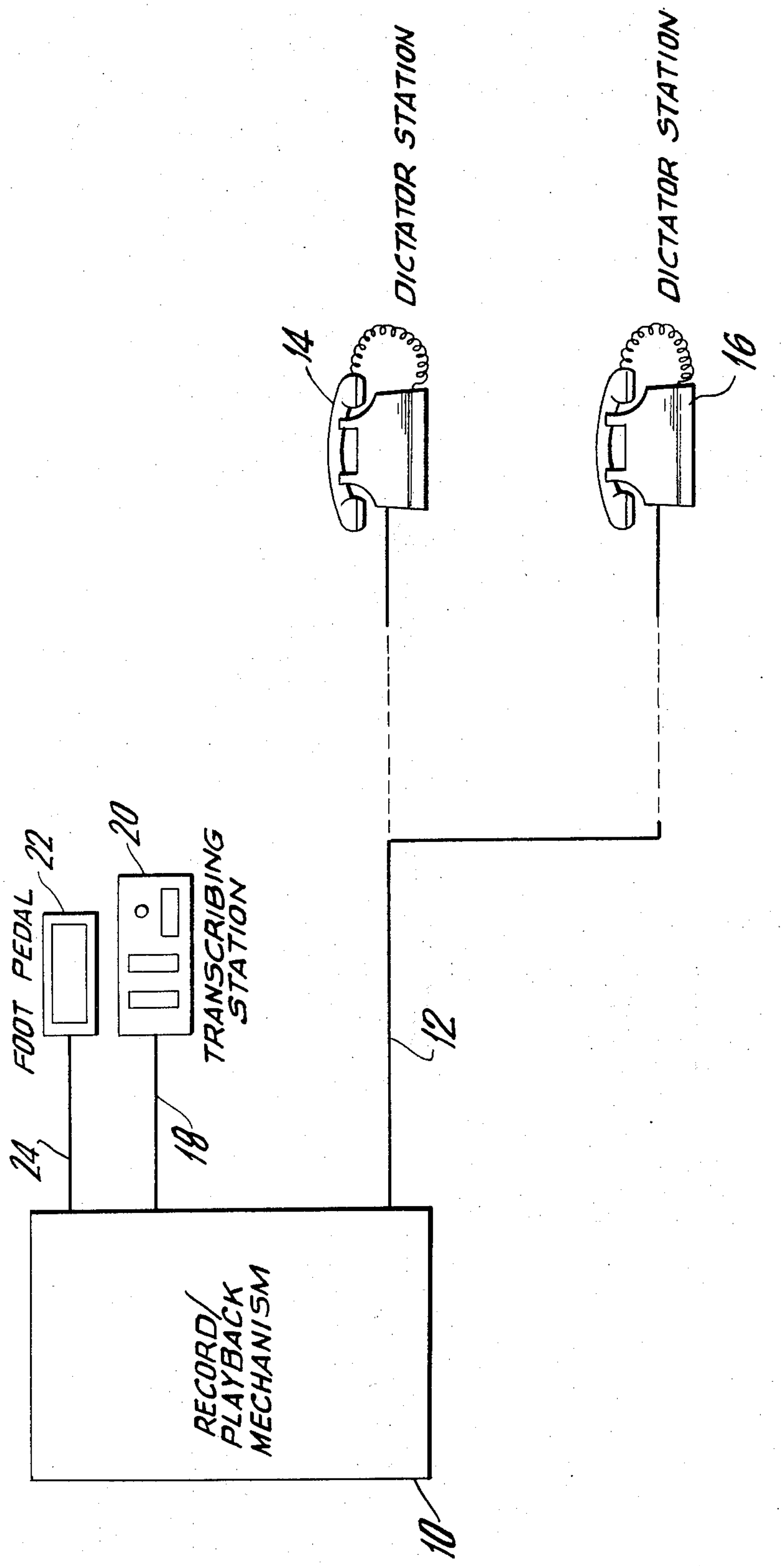
FIG. 1 is a diagrammatic illustration of a remote station dictating system of the type in which the circuit of the invention is intended to be used.

Referring now more particularly to FIG. 1 a dictating/playback system is diagrammatically illustrated as comprising a central record/playback unit 10 which is connected through a multi-conductor cable 12 to a plurality of remote dictating stations illustrated generally by dictating stations 14 and 16 which are connected in parallel with the record/playback unit 10. The record/playback unit 10 is also connected through a multi-conductor cable 18 to a transcribing station 20. At the transcribing station messages recorded from the dictating stations 14 or 16 or an endless loop tape 26 (FIG. 2) within the record/playback unit 10 may be played back over the transcribing station 20 to a typist. The transcribe mode of the record/playback unit 10 may be controlled by the typist through a foot pedal 22 connected to the record/playback unit through a cable 24. The playback mode of each dictating station is controlled by the particular dictating station 14 or 16.

When any particular dictating station is being used ("activated") to record or play back messages on the record/playback unit 10, the remaining remote dictating stations connected in parallel with it are blocked from controlling the record/playback unit and are unable to hear what is being recorded or played back through the activated remote dictating station by means of the privacy and seizure control circuit described in the co-pending application noted above.

Figure 2:
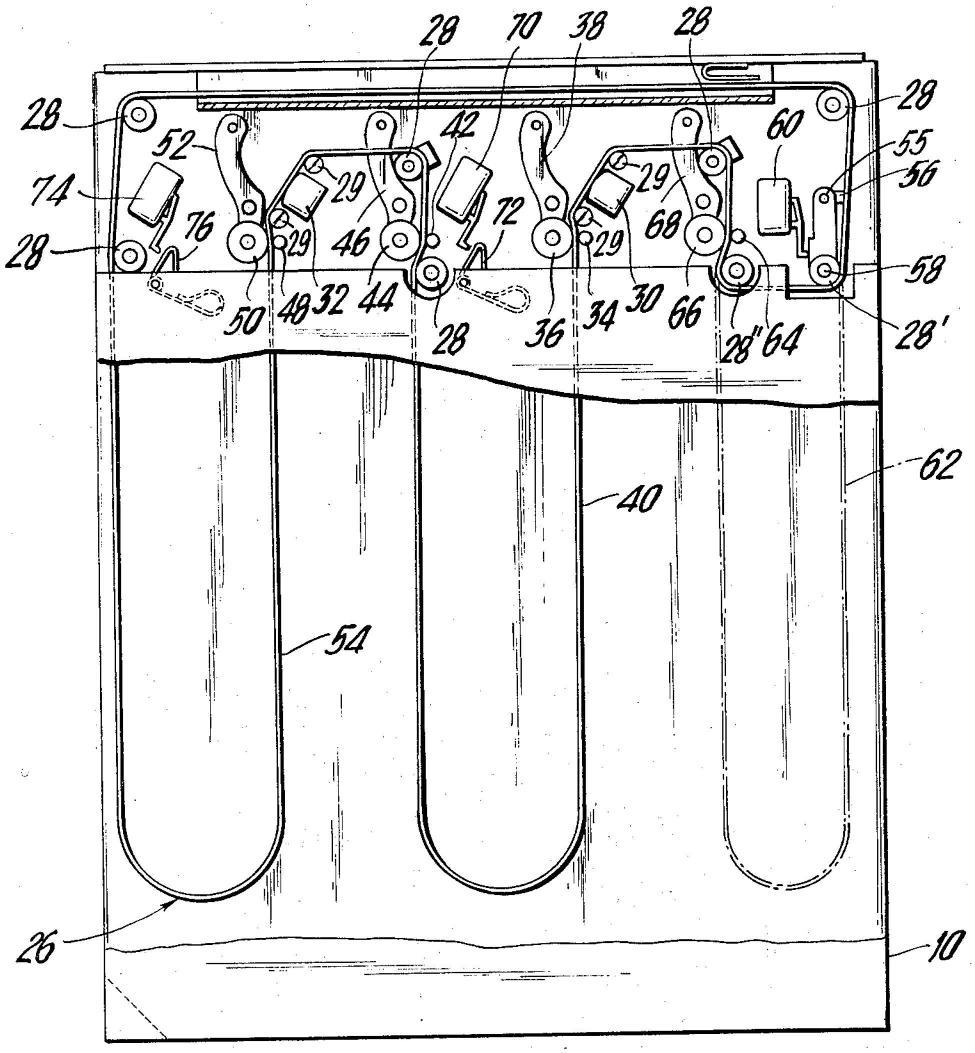
FIG. 2 is an elevational view, with portions broken away, of one plane side of the central record/playback mechanism depicted in FIG. 1.
Figure 3:
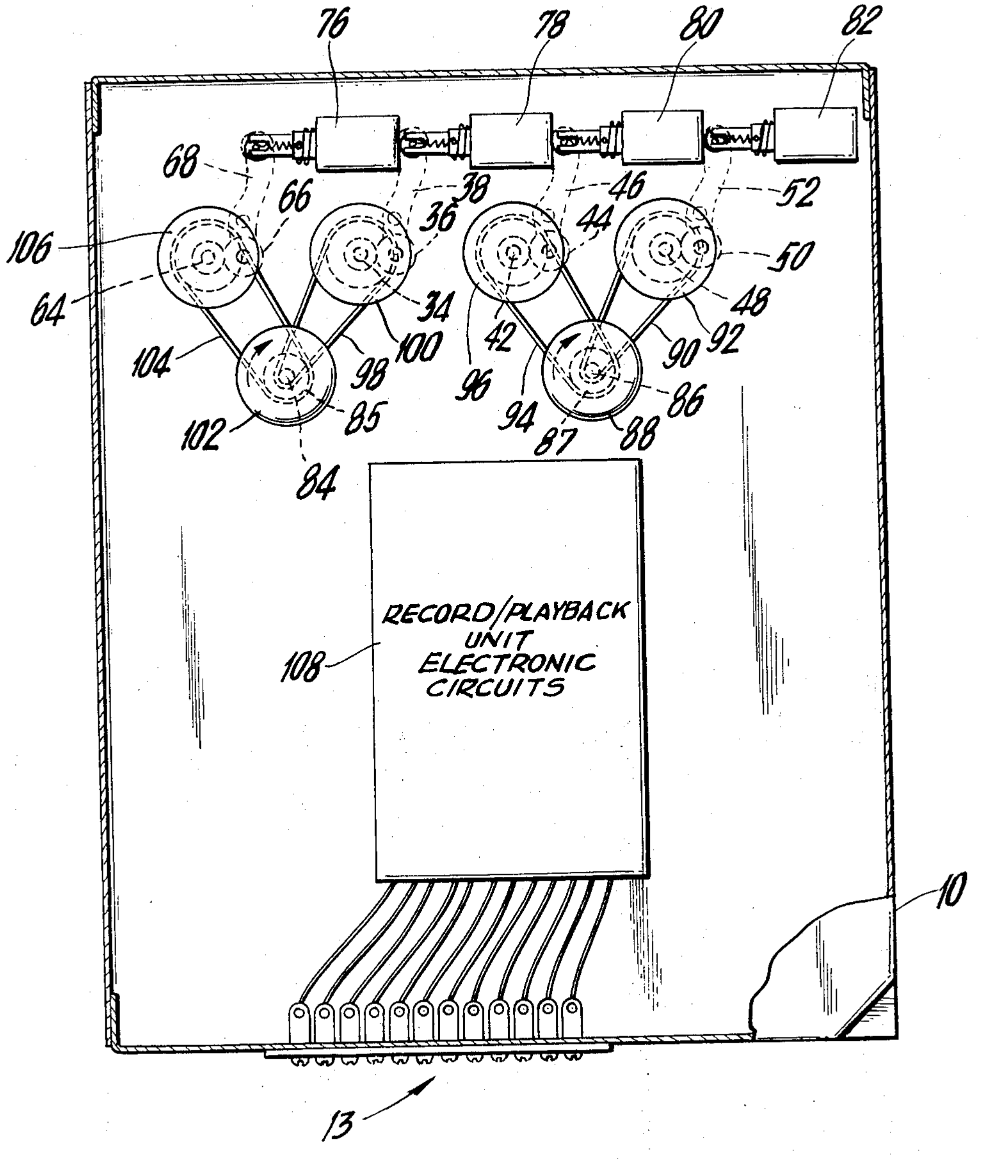
FIG. 3 is an elevational view in section of the side opposite the view of FIG. 2 of the central playback unit of FIG. 1.

Referring now more particularly to FIGS. 2 and 3 the tape handling mechanism of the central record/playback unit 10 is illustrated. A endless loop of magnetic tape 26 is supported by a plurality of rollers 28 and spindles 29 and is first drawn past a record/playback/erase magnetic head 30 and then a transcribe head 32 in the central record/playback unit 10. The tape is drawn past the record/playback/erase head 30 by a capstan 34 against which the tape is pressed by an opposed pressure roller 36 mounted on a pivoted arm 38. As will be described in further detail below the pressure roller arm 38 is moved by a solenoid 78 (FIG. 3) to pivot the pressure roller 36 against the tape to selectively engage the tape with the motor driven capstan 34. The direction of rotation of the capstan 34 is counter-clockwise as viewed in FIG. 2.

The recorded tape is formed into a loop 40 which then passes between a motor driven capstan 42 and an opposed pressure roller 44 mounted on a pivoted arm 46. The motor driven capstan 42 rotates in the counterclockwise direction as viewed in FIG. 2 and when a solenoid 80 (FIG. 3) attached to the arm 46 is energized, the pressure roller 44 engages the tape with the capstan 42 to backspace transcribed tape into the loop 40. The tape 26 leaving the capstan 42 and the pressure roller 44 in the forward direction passes over one of the rollers 28, a spindle 29, the transcribe magnetic head 32, a second spindle 29 and between a motor driven capstan 48 and an opposed pressure roller 50 mounted on a pivoted arm 52.

The motor driven capstan 48 rotates in the counterclockwise direction as viewed in FIG. 2 and when the pressure roller 50 is pivoted with the arm 52 by a solenoid 82 (FIG. 3) connected to the arm the tape is engaged with the capstan 48 and drawn past the transcribe head 32. The transcribed tape leaving the head 32 forms a loop designated 54.

During dictation, the transcribed tape leaves the loop 54 and is carried over various rollers 28 past an erase magnet mechanism 56 pivoted on a shaft 55. Tape leaving the erase magnet passes over a roller 28' rotatably mounted on a shaft 58 at the lower portion of the mechanism 56. Spaced from the pivotably mounted roller 28' is a stationary second roller 28'' over which the tape also passes. A mechanical switch 60 is mounted such that its switch-arm is engaged by the pivoted erase magnet mechanism 56 when the tape being drawn over the rollers 28' and 28'' becomes taut. When the tape between the rollers 28'' and 28' is slacked as indicated in the dotted line loop 62, representing tape which has been backspaced past the head 30, the erase magnet mechanism 56 is caused to pivot by the force of gravity in the counterclockwise direction as viewed in FIG. 2 and is thereby disengaged from the arm of the switch 60. In this condition the switch 60 is closed. When the tape is taut between the rollers 28' and 28'' the erase magnet mechanism 56 is in a substantially upright position as viewed in FIG. 2 to thereby engage the arm of the switch 60 causing it to open.

The tape passing over the roller 28'' to the record/playback/erase head 30 passes between a motor driven capstan 64 and an opposed pressure roller 66 mounted on a pivoted arm 68. The capstan 64 rotates in the counterclockwise direction as viewed in FIG. 2 and when a solenoid 76 (FIG. 3) is activated to move the pivoted arm 68 the pressure roller 66 engages the tape with the capstan 64 to cause the tape to be backspaced past the record/playback/erase head 30 to thereby form the loop 62.

A normally closed transcribe limit switch is located between the capstan 42 and the pressure roller 36 to sense the tautness of the recorded tape loop 40. The switch-arm of the transcribe limit switch 70 is engaged by a pivoted swing arm 72 when the tape loop 40 is taut between the pressure roller 36 and the capstan 42. When recorded tape is stored in the loop 40 between the transcribing and recording stations, the swing arm 72 is disengaged with the arm of the switch 70 thereby closing the switch.

Similarly, a dictate limit switch 74 is located with respect to the transcribed tape loop 54 such that a pivoted swing arm 76 which is contacted by the loop 54 when the loop 54 is drawn taut is engaged with the arm of the switch 74 to open the switch 74. When the switch 74 is opened the solenoid 78 is thereby deenergized to release the pressure roller 36 from engaging the tape with the capstan 34, as will be explained in greater detail below.

Referring now more particularly to FIG. 3 the solenoids 78, 78, 80 and 82 described above in reference to FIG. 2 are engaged with the respective pressure roller arms 68, 38, 46 and 52. The transcriber motor 88 has a drive shaft on which are mounted a relatively small diameter pulley 86 and a relatively large diameter pulley 87. The pulley 86 is connected by a belt 90 to a flywheel and pulley 92 mounted on the capstan shaft 48. The pulley 87 is connected by a belt 94 to a flywheel and pulley 96 mounted on the capstan shaft 42.

The dictate motor 102 has a drive shaft on which are mounted a relatively small diameter pulley 84 and a relatively large diameter pulley 85. The pulley 84 is connected by a belt 98 to a flywheel and pulley 100 which is mounted on the capstan shaft 34. The pulley 85 is connected by a belt 104 to a flywheel and pulley 106 mounted on the capstan shaft 64. The record/playback unit electronic circuits designated generally 108 are connected by a plurality of wires to the external terminals designated generally 13 of the playback unit 10.

Figure 4:
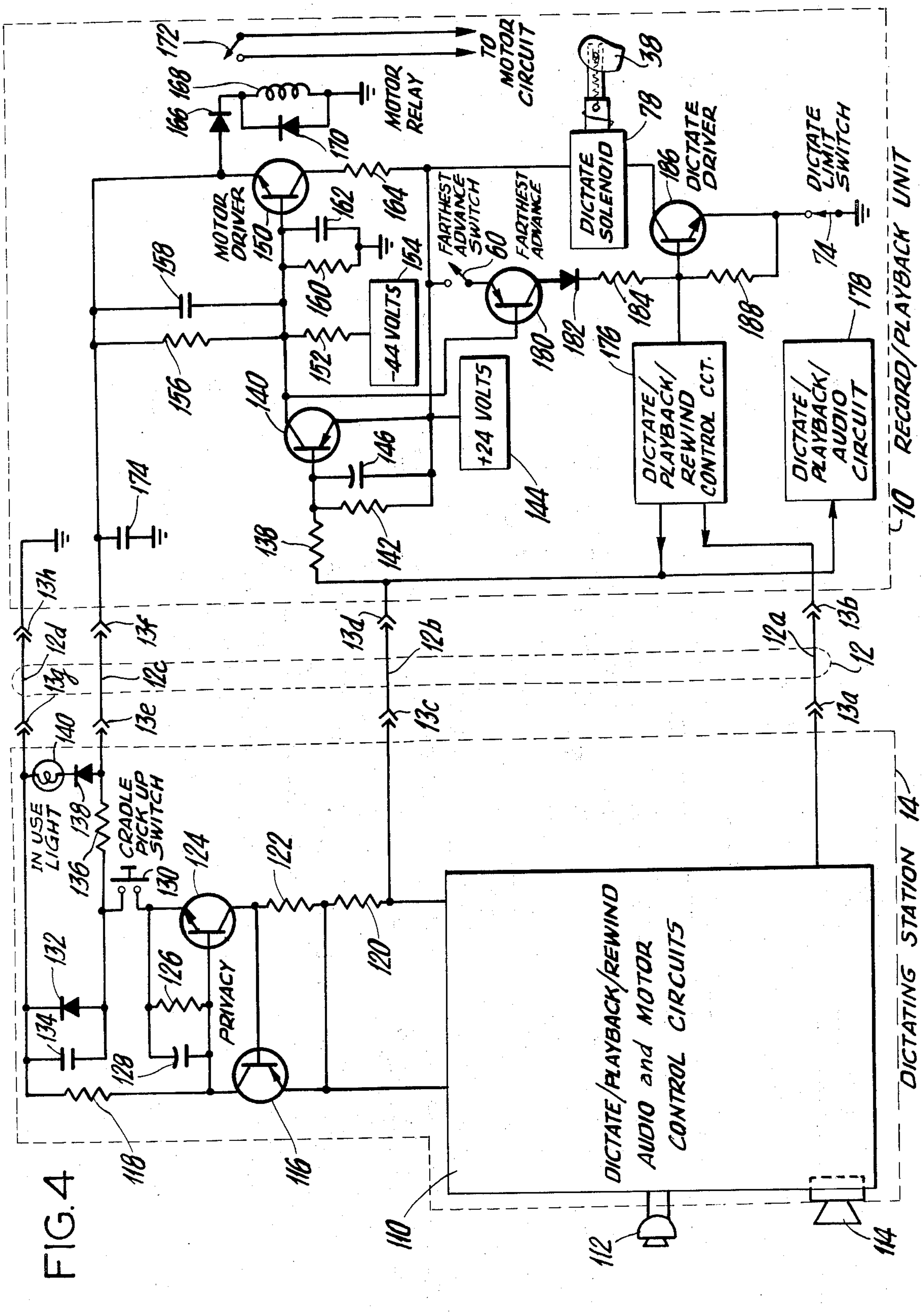
FIG. 4 is a schematic diagram of the farthest advance circuit of the invention.

Referring now more particulary to FIG. 4 the remote dictating station 14, illustrated as being enclosed by a dotted line, includes dictate, playback, rewind, audio and motor control circuits designated generally 110, a microphone 112 and a playback speaker 114 connected to the circuits 110. The circuits 110 supply the audio signal which is recorded at the central record/playback mechanism 10 and also provide control signals to control the record/playback unit motor and the various solenoids 76 and 78 discussed above. The details of the circuits 110 are not shown since they are not relevant to the invention and may comprise any of various circuits of this type known to the art or they may comprise circuits of the type disclosed in the aforementioned copending applications of which the applicant is an inventor.

A lead 12*a* in the multi-conductor cable 12 is connected between an external terminal 13*a* at the remote dictating station 14 and an external terminal 13*b* at the central record/playback unit 10. A lead 12*b* in the multi-conductor cable 12 is connected between an external terminal 13*c* of the remote dictating station and an external terminal 13*d* at the central record/playback unit. The circuits 110 are connected directly to the terminals 13*a* and 13*c*.

The circuits 110 are also connected to the emitter electrode of a PNP transistor 116 whose collector electrode is connected through a resistor 118 to the external terminal 13*g* at the dictating station 14. The external terminal 13*g* is connected through a wire 12*d* within the multiple conductor cable 12 to an external terminal 13*h* at the record/playback mechanism 10. The terminal 13*h* is connected to the circuit ground within the record/playback unit 10.

The emitter electrode of the transistor 116 is connected to the terminal 13*c* through a resistor 120 and to its own base electrode through a resistor 122. The base electrode of the transistor 116 is connected to the collector electrode of an NPN transistor 124. The base electrode of the transistor 124 is connected directly to the collector electrode of the transistor 116 and through a resistor 126 to the emitter electrode of the transistor 124. A capacitor 128 is connected in parallel with the resistor 126. The emitter electrode of the transistor 124 is connected to one lead of a normally open, cradle pickup switch 130 whose other lead is connected to the anode of a diode 132. The cathode of the diode 132 is connected to the grounded external terminal 13*g*. The normally open cradle pickup switch 130 is closed when the handset of the dictating station is lifted from its cradle.

A capacitor 134 is connected in parallel with the diode 132. The anode of the diode 132 is connected through a resistor 136 to the anode terminal of a diode 138 whose cathode terminal is connected through an "in use" light 140 to the terminal 13*g*. The anode terminal of the diode 138 is also connected to an external terminal 13*e* at the dictating station 14. The terminal 13*e* is connected by a wire 12*c* in the multiple conductor cable 12 to an external terminal 13*f* at the record/playback unit 10.

The external terminal 13*d* of the record/playback unit 10 is connected through a resistor 138 to the base electrode of a PNP transistor 140 and through a resistor 142 to a bias source 144 of +24 volts. A capacitor 146 is connected in parallel with the resistor 142. The emitter electrode of the transistor 140 is connected to the bias source 144.

The collector electrode of the transistor 140 is connected to the base electrode of an NPN, motor driver transistor 150 and through a resistor 152 to a bias source 154 of −44 volts. The collector electrode of the transistor 140 is further connected to the external terminal 13*f* through a resistor 156 connected in parallel with a capacitor 158. The external terminal 13*f* is connected to the circuit ground through a capacitor 174.

The base electrode of the transistor 150 is connected to the circuit ground through a resistor 160 connected in parallel with a capacitor 162. The collector electrode of the transistor 150 is connected through a resistor 164 to the bias course 144. The emitter electrode of the transistor 150 is connected directly to the terminal 13*f* and to the anode of a diode 166 whose cathode is connected to one lead of the coil of a motor control relay 168. The other lead of the relay coil 168 is connected to the circuit ground. The anode of a diode 170 is connected to the circuit ground and the cathode of the diode 170 is connected to the cathode of the diode 166. The purpose of the diode 170 is to provide a shunt circuit for back EMF generated in the relay coil 168 when voltage is rapidly supplied and discontinued through the diode 166. The motor relay 168 opens and closes a pair of relay contacts 172 to energize the motors 88 and 102 of the record/playback unit 10.

The external terminal 13*d* is connected to a separate input of a dictate/playback/rewind control circuit 176 and to a dictate/playback audio circuit 178 which are within the record/playback unit 10. The circuits 176 and 178 are not shown in detail since they are not directly pertinent to the present invention and they may comprise circuits of the type known to those skilled in the art. As is exlained in greater detail hereinafter and in the aforementioned co-pending applications, the control circuit 110 in the dictating unit 14 activate the circuits 176 and 178 by providing a circuit ground return path to the "input" leads of the circuits 176 and 178. It is to be understood that a plurality of dictating stations are connected in parallel through the multiple conductor cable 12 to the terminals 13*b*, 13*d*, 13*f* and 13*h* of the record/playback unit 10.

In operation, when the hand unit of a particular dictating station, such as dictating station 14, is lifted from its cradle the cradle pickup switch 130 is closed thereby supplying a −44 volt bias from the source 154 through the resistors 152, 156 and 136 and the switch 130 to the emitter electrode of the transistor 124. The −44 volt bias supplied to the emitter electrode of the transistor 124 also flows through the resistors 126 and 118 to the circuit ground thereby developing a positive bias voltage on the base of transistor 124 which makes it become conductive or "on."

When transistor 124 becomes conductive, current from the +24 volt source 144 flows through the resistors 142, 138, and 120, the emitter-base junction of the transistor 116 connected in parallel with the resistor 122, the collector-emitter junction of the transistor 124, the switch 130 and the diode 132 to the circuit ground. The voltage drop developed across the resistor 122 places a negative bias on the base of the transistor 116 with respect to its emitter thereby making it conductive. When transistor 116 becomes conductive it supplies a positive bias to the base of transistor 124 from the junction of the resistors 120 and 122 and thus the transistors 116 and 124 "lock up" on each other in the conductive condition.

The flow of bias current from the +24 volt source 144 through the resistor 142 as described above also develops a negative bias voltage on the base electrode of the transistor 140 thereby turning it on. When transistor 140 thus becomes conductive, current from the +24 volt source 144 flows through the emitter-collector junction of the transistor 140 and the resistor 160 to the circuit ground thereby providing a positive bias voltage to the base of the motor driver transistor 150. This causes the transistor 150 to become conductive and thereby supply a voltage from the +24 volt source through the collector load resistor 164 and the collector-emitter junction of the transistor 150 to the motor relay 168 through the semiconductor diode 166. The current flowing through the motor relay 168 energizes it and closes the contact switch 172 to thereby turn the record/playback unit motor on.

The positive voltage supplied to the motor relay 168 at the emitter electrode of the motor driver transistor 150 is also supplied to the external terminal 13*e* of the dictating station. The resistances 156 and 152 in series with the −44 volt source 154 are sufficiently high in magnitude that the potential developed at the external terminal 13*e* after the motor driver transistor 150 becomes conductive is substantially +24 volts. The +24 volt potential at terminal 13*e* flows through the diodes 138 and the in use lights 140 of each of the dictating stations which are connected in parallel with the dictating station 14. The in use lights 140 are thus lighted to indicate that one of the remote dictating stations has seized control of the central record/playback unit 10.

This positive bias voltage at terminal 13*e* also prevents any other dictating stations from seizing control of the system. When a particular cradle pickup switch 130 in any other dictating station is closed subsequent to the seizure of control by one dictating station there is no −44 bolt bias voltage to be applied to the emitter electrode of the transistor 124 connected to the closed pickup switch 130. This prevents the transistor pairs 116 and 124 from locking up on each other and, as will be explained in greater detail, thereby prevents the other dictating stations from seizing control of the system.

All of the audio and control circuits 110 of the remote dictating stations 14 require a ground return connection to the circuit ground terminal 13*h* of the record/playback unit 10 in order to operate. When a remote dictating station 14 has seized control of the central record/playback unit 10 this ground return is supplied by the series connection through the resistor 120, the emitter-base junction of the transistor 116 in parallel with the resistor 122, the collector-emitter junction of the transistor 124, the cradle pickup switch 130, the diode 132, and the lead 12*d* to the circuit ground terminal 13*h*. Thus the other dictating stations connected in parallel with the activated dictating station 14 are disabled from controlling the central record/playback unit 10 so long as one dictating station 14 has seized control of the system because in the other dictating stations the transistors 124 are in their non-conductive or open state, and as explained above, may not be made conductive because of the +24 volt bias voltage applied to the lead 12*c*. In such dictating stations the circuit ground return path is reversed biased to be electrically "open."

In the event that the operator of the remote dictating station has backspaced the tape loop 26 past the record/playback/erase head 30 to produce the loop 62, the switch 60 will be closed, as explained above. One lead of the switch 60 is connected to the +24 volt source 144 and the other lead is connected to the emitter electrode of a PNP, farthest advance transistor switch 180 whose base electrode is connected directly to the collector electrode of the transistor 140. The collector electrode of the transistor 180 is connected to the anode electrode of a diode 182 whose cathode is connected through a resistor 184 to the base electrode of an NPN, dictate driver transistor switch 186.

The collector electrode of the transistor 186 is connected to one lead of the dictate solenoid 78. The other lead of the dictate solenoid 78 is connected to the +24 volt source 144. The emitter electrode of the transistor 186 is connected to the circuit ground through the normally closed dictate limit switch 74. The base electrode of the transistor 186 is connected to the output of the dictate/playback/rewind control circuit 176 and is also connected to the emitter electrode of the transistor 186 through a resistor 188.

In operation, when the handset of the remote dictating station is replaced in its cradle, the pickup switch 130 is opened which disrupts the flow of current through the transistor 124 and causes the paired transistors 116 and 124 to become nonconductive. With no current flowing through the transistor 124 from the voltage source 144 the bias voltage applied to the base of the seizure transistor 140 ceases thereby causing transistor 140 to become non-conductive.

If the switch 60 is open when the handset is hung up, all of the circuits are shut down thereby placing the system in a standby condition to be operated by the next remote dictating station to seize control. However, if the switch 60 is closed, thereby indicating the presence of a loop of recorded tape 62 which has been backspaced past the record/playback/erase head 30, when the transistor 180 is biased through the resistor 160 to become conductive. It should be noted that when the switch 130 is closed and the transistors 124, 116 and 140 are conductive the transistor 180 is prevented from being made conductive because a sufficiently high positive bias is supplied to its base from the source 144 through the emitter-collector junction of the transistor 140. Without this feature the farthest advance circuit would be activated as soon as slack occurred in the tape loop during backspacing.

The current from the source 144 flowing through the base-emitter junction of the transistor 180 maintains the positive bias on the base of the transistor 150 and it remains in its conductive state. This in turn means that the motor relay 168 remains energized and the relay contacts 172 remain closed to energize the motors 88 and 102 of the record/playbck unit 10. Furthermore the +24 volt bias is supplied through the lead 12*c* to the remote dictating stations to light the in-use lamps 140 and to prevent the system from being seized by any of the remote dictating stations.

The current flowing through the emitter-collector junction of the transistor 180, the diode 182 and the resistor 184 to the base of the transistor 186 causes it to become conductive to complete the current path from the +24 volt source 144 through the dictate solenoid 78 to the circuit ground, thereby energizing the dictate solenoid 78. When the dictate solenoid 78 is energized, as described above, the pressure roller mounted on the arm 38 causes the tape to become engaged with the capstan 34 to advance the tape loop 62 past the record/playback head 30 until it is taut, thereby opening the switch 60 as explained above. When the switch 60 is open all circuits are shut down thereby placing the system in a standby condition for use by another remote dictating station.

Similarly, when the tape loop 54 is drawn taut between the pressure roller 50 and the roller 28 the dictate limit switch 74 is caused to open. When the switch 74 opens the transistor 186 becomes non-conductive and the dictate solenoid 78 is de-energized to stop the dictate operation until slack in the transcribed tape loop 54 is provided.

While transistor of certain conductivity types have been described above it should be apparent that in other embodiments transistors of different conductivity types may be substituted with appropriate changes in the polarities of the biasing circuits. Furthermore in still other embodiments other types of semiconductor electronic switches, such as silicon controlled rectifiers, by way of example only, may be substituted individually or for combinations of the switching transistors 116, 124, 140, 150, 180 and 186.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. An improved record/playback system of the type having a plurality of remote dictating stations connected to at least one common terminal at a central record/playback unit, the remote dictating stations each including a separate privacy and seizure control circuit, the central record/playback unit having an endless loop of recording material, transducing head means for recording signals on and playing signals back from the recording material and electro-mechanical means for movably supporting the loop of recording material and advancing the loop of recording material past the transducing head means, wherein the improvement comprises first switch means for sensing the tautness of the loop of recording material prior to being advanced past the transducing head means, electronic second switch means connected between the first switch means, the privacy and seizure control circuits and the electro-mechanical means, first bias means for supplying a first voltage of a predetermined polarity through the first switch means to bias the second switch means into a conductive state when the first switch means is closed due to the slackness of the loop of recording material, a portion of the first voltage further passing through the conductive second switch means to activate the electro-mechanical means to advance the loop of recording material past the transducing head and to disable the seizure control circuits of the remote dictating stations.

2. An improved record/playback system as recited in claim 1 wherein each remote dictating station includes a control circuit and each privacy and seizure control circuit includes electronic third switch means connected in series between the control circuit and the common terminal, second means at the central record/playback unit for selectively supplying a second bias voltage of a polarity opposite to the first voltage to the third switch means to make it become substantially conductive, and electronic fourth switch means responsive to the conductive state of the third switch means and connected between the first bias means and the third switch means for supplying the first voltage to the third switch means to maintain it in its substantially conductive state when the third switch means is made substantially conductive by the second bias means.

3. An improved record/playback system as recited in claim 2 wherein the privacy and seizure control circuits each further include a first diode, a first, a second, and a third resistor and fifth switch means having two terminals, the third switch means includes a first transistor of one conductivity type including a collector electrode and an emitter electrode and having one of said collector and emitter electrodes connected to one terminal of the fifth switch means, its base electrode connected through the first resistor to the common terminal, and the other of its collector and emitter electrodes connected to one lead of the second resistor, the third resistor being connected between the base electrode of the first transistor and the one terminal of the fifth switch means, the first bias means includes a voltage source connected to the other lead of the second resistor, the fourth switch means includes a second transistor of a conductivity type opposite to that of the first transistor and including a collector electrode and an emitter electrode and having one of said collector and emitter electrodes connected to the base electrode of the first transistor, the other of its collector and emitter electrodes connected to the voltage source of the first bias means, and its base electrode connected to the one of the collector and emitter electrodes of the first transistor which is connected to the second resistor, the first diode being connected between the other terminal of the fifth switch means and the common terminal of the central record/playback unit with its polarity oriented such that current which passes through the first transistor and the fifth switch means is passed through the first diode to the common terminal, and the second bias means including a second bias voltage source which is connected to the other terminal of the fifth switch means.

4. An improved record/playback system as recited in claim 2 further comprising at the central record/playback unit electronic fifth switch means responsive to the flow of current from the first bias means through the third switch means and connected between the first bias means and the electro-mechanical means for supplying the first voltage to the electro-mechanical means when the third switch means is conductive and drawing current from the first bias means.

5. An improved record/playback system as recited in claim 4 wherein the electro-mechanical means includes motor driven means for advancing the loop of recording material, the motor driven means including a relay coil, electronic sixth switch means connected in series both between the first bias means and the relay coil and in series between the first bias means and the third switch means to supply the first voltage as a reverse bias voltage to the third switch means, the second switch means and the sixth switch means each having separate control electrodes connected together and in series with the fifth switch means to the first bias means, the sixth switch means being made conductive and non-conductive in response to the conductive state of both the second and fifth switch means, and solenoid means for selectively engaging the loop of recording material with the motor driven means, and electronic seventh switch means for selectively completing a series connection between the first bias means, the solenoid means and the common terminal to energize the solenoid means, the second switch means being connected between the first bias means and the seventh switch means to provide a bias which makes the seventh switch means conductive when the second switch means becomes conductive.

* * * * *